(12) United States Patent
Sendoda (10) Patent No.: US 11,971,694 B2
(45) Date of Patent: Apr. 30, 2024

(54) ABNORMAL-SOUND DETECTION DEVICE AND ABNORMAL-SOUND DETECTION METHOD

(71) Applicant: NEC CORPORATION, Tokyo (JP)

(72) Inventor: Mitsuru Sendoda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 916 days.

(21) Appl. No.: 16/964,636

(22) PCT Filed: Feb. 15, 2019

(86) PCT No.: PCT/JP2019/005466
§ 371 (c)(1),
(2) Date: Jul. 24, 2020

(87) PCT Pub. No.: WO2019/160070
PCT Pub. Date: Aug. 22, 2019

(65) Prior Publication Data
US 2021/0055705 A1  Feb. 25, 2021

(30) Foreign Application Priority Data
Feb. 16, 2018 (JP) .................................. 2018-026170

(51) Int. Cl.
*G05B 19/042* (2006.01)
*G01S 3/808* (2006.01)
(Continued)

(52) U.S. Cl.
CPC ........ *G05B 19/0425* (2013.01); *G01S 3/8083* (2013.01); *G01S 5/0063* (2013.01);
(Continued)

(58) Field of Classification Search
CPC . G01S 3/8083; G01S 5/0063; G05B 19/0428; G05B 2219/37332;
(Continued)

(56) References Cited

U.S. PATENT DOCUMENTS

2012/0146789 A1* 6/2012 De Luca ................ G08B 21/24
382/103
2015/0332463 A1* 11/2015 Galera .................... H04N 7/18
382/103

(Continued)

FOREIGN PATENT DOCUMENTS

JP        60-016386 A    1/1985
JP      2002-300569 A   10/2002
(Continued)

OTHER PUBLICATIONS

Written opinion for PCT/JP2019/005466 dated May 14, 2019.
International search report for PCT/JP2019/005466 dated May 14, 2019.

*Primary Examiner* — Yoshihisa Ishizuka
*Assistant Examiner* — Carter W Ferrell
(74) *Attorney, Agent, or Firm* — Sughrue Mion, PLLC (57) ABSTRACT

An abnormal-sound detection device has an imaging unit, an operation range identification unit, a sound collection unit, an abnormal-sound detection unit, an abnormal-sound generation position identification unit, and an abnormal-sound source determination unit. The operation range identification unit identifies and stores the operation range of a diagnosis object on the basis of the image captured by an imaging unit. The abnormal-sound detection unit detects abnormalities in sounds included in the sounds collected by the sound collection unit, the sounds arriving from the diagnosis object. When an abnormality in a sound is detected by the abnormal-sound detection unit, the abnormal-sound generation position identification unit identifies the position at which the abnormality of the sound was generated. The abnormal-sound source determination unit compares the operation range and the abnormal-sound generation position of the diagnosis object, and determines whether the abnor- (Continued)

mality of the sound is derived from an abnormality of the diagnosis object.

10 Claims, 7 Drawing Sheets

(51) Int. Cl.
 *G01S 5/00* (2006.01)
 *G06N 20/00* (2019.01)
 *H04N 7/18* (2006.01)
 *H04N 23/60* (2023.01)
 *H04R 1/40* (2006.01)
 *H04R 3/00* (2006.01)
(52) U.S. Cl.
 CPC ......... *G05B 19/0428* (2013.01); *G06N 20/00* (2019.01); *H04N 7/18* (2013.01); *H04N 23/60* (2023.01); *H04R 1/406* (2013.01); *H04R 3/005* (2013.01); *G05B 2219/35502* (2013.01); *G05B 2219/37332* (2013.01); *G05B 2219/37433* (2013.01); *G05B 2219/40162* (2013.01); *H04R 2430/20* (2013.01)
(58) Field of Classification Search
 CPC ........... G05B 2219/37433; G05B 2219/40162; G05B 2219/35502; G05B 2219/31447; G05B 19/0425; H04R 1/406; H04R 3/005; H04R 2430/20; H04N 7/183; H04N 7/18; G01H 3/00
 See application file for complete search history.

(56) References Cited

U.S. PATENT DOCUMENTS

2016/0277863 A1\* 9/2016 Cahill .................... G01S 3/8083
2017/0154638 A1\* 6/2017 Hwang ................... G01S 3/803

FOREIGN PATENT DOCUMENTS

| JP | 2004-085455 A | 3/2004 |
| JP | 2005-252660 A | 9/2005 |
| JP | 2008-033532 A | 2/2008 |
| JP | 2009-118318 A | 5/2009 |
| JP | 2014-137323 A | 7/2014 |
| JP | 2017-161223 A | 9/2017 |
| WO | 2017/191362 A1 | 11/2017 |
| WO | WO-2017191362 A1 \* | 11/2017 |

\* cited by examiner

ABNORMAL-SOUND DETECTION DEVICE AND ABNORMAL-SOUND DETECTION METHOD

CROSS-REFERENCE TO RELATED APPLICATIONS

This application is a National Stage of International Application No. PCT/JP2019/005466 filed on Feb. 15, 2019, which claims priority under U.S.C. § 119(a) to Japanese Patent Application No. JP 2018-026170 filed on Feb. 16, 2018, the disclosure of which is incorporated herein in its entirety by reference.

TECHNICAL FIELD

The present invention relates to an abnormal-sound detection device and an abnormal-sound detection method.

As a technique for diagnosing equipment or the like operating in a factory, a power plant, or the like, there is known a method that detects an abnormal characteristic, based on a sound generated by the equipment. In recent years, in various devices, particularly, production facilities running in a factory or a plant, a delay resulting from a failure influences productivity and cost, and therefore, is not permitted. A great cost may be needed for recovery, and predicting or quickly solving a failure is required.

Accordingly, as a technique for diagnosing equipment or the like operating in a factory, a power plant, or the like, there is known a method that diagnoses an abnormal characteristic, based on sound generated by the equipment. Further, a system that specifies a direction of a generation source of an abnormal sound, and reports abnormality information together with an image has been developed.

For example, PTL 1 discloses a technique of performing specification of a sound source direction of a sensed sound by use of a microphone array in which a plurality of microphones are arrayed, and capturing a sound source by directing a camera to the direction. PTL 1 also discloses a technique of displaying a position of a sound source over a captured video. This facilitates discovery of an abnormality by monitoring personnel.

For example, PTL 2 discloses a technique of sensing an abnormality by use of a stereo or 3D microphone, various sensors, or a camera, and specifying a direction of a sound source, based on outputs of a plurality of microphones. Discovery of an abnormality is facilitated by visually displaying, in an image, a position of a sound source and sound information such as a sound level.

CITATION LIST

Patent Literature

[PTL 1] Japanese Unexamined Patent Application Publication No. 2005-252660
[PTL 2] Japanese Unexamined Patent Application Publication No. 2002-300569

SUMMARY OF INVENTION

Technical Problem

However, the technique described in PTL 1 performs capturing by directing a camera to a direction of a sound source, and therefore, has a problem that incorrect detection of capturing and monitoring a non-abnormal video occurs when originally non-abnormal maintenance work or the like is a sound source.

The technique described in PTL 2 performs abnormality sensing by use of a threshold value regarding a voice level or the like. Thus, when originally non-abnormal maintenance work or the like is a sound source having a level being more than the threshold value, there is a problem that incorrect detection similar to that in PTL 1 occurs.

The present invention has been devised in order to solve the problem described above, and an object thereof is to provide an abnormal-sound detection device in which incorrect detection is rare.

Solution to Problem

In order to solve the problem described above, an abnormal-sound detection device according to the present invention includes an imaging means, an operation range identification means, a sound collection means, an abnormal-sound sensing means, an abnormal-sound generation position identification means, and an abnormal-sound derivation determination unit. The imaging means captures a video of a diagnosis object. The operation range identification means identifies and stores an operation range of the diagnosis object, based on the video captured by the imaging means. The sound collection means collects sounds arriving from the diagnosis object and a vicinity thereof. The abnormal-sound sensing means senses an abnormality of a sound included in the collected sounds. The abnormal-sound generation position identification means identifies, when an abnormality of a sound is sensed by the abnormal-sound sensing means, a position at which the abnormality of the sound occurs. The abnormal-sound derivation determination means compares the operation range of the diagnosis object with the abnormal-sound generation position, and determines whether the abnormal sound is derived from an abnormality of the diagnosis object.

Advantageous Effects of Invention

An advantageous effect of the present invention is that an abnormal-sound detection device in which incorrect detection is rare is able to be provided.

EXAMPLE EMBODIMENT

Example embodiments of the present invention will be described below in detail with reference to the drawings. A technically preferable limitation is imposed on the example embodiments described below in order to implement the present invention, but does not limit the scope of the invention to the following. The same reference sign may be assigned to a similar component in each drawing, and description thereof may be omitted.

First Example Embodiment

Figure 1:
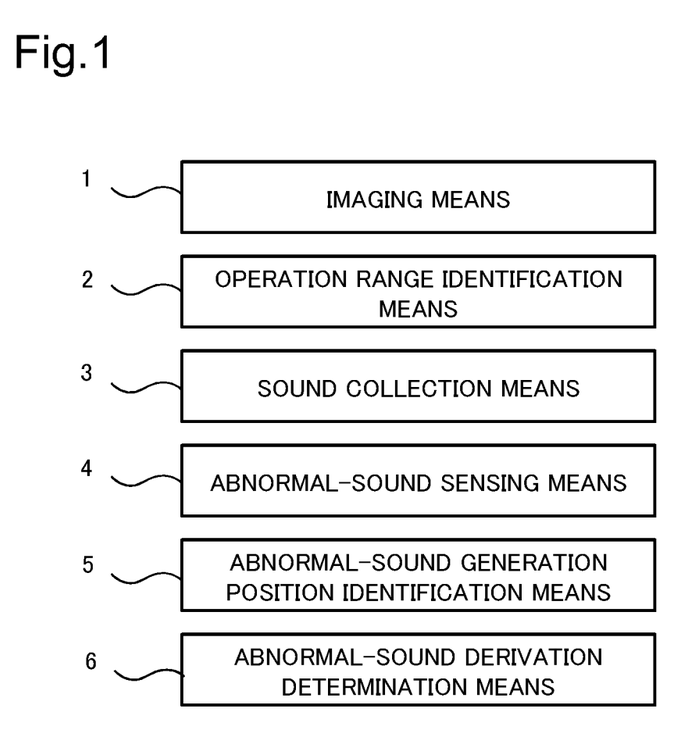
FIG. 1 is a block diagram illustrating an abnormal-sound detection device according to a first example embodiment.

FIG. 1 is a block diagram illustrating an abnormal-sound detection device according to the present example embodiment. The abnormal-sound detection device includes an imaging means 1, an operation range identification means 2, a sound collection means 3, an abnormal-sound sensing means 4, an abnormal-sound generation position identification means 5, and an abnormal-sound derivation determination means 6.

The imaging means 1 captures a video of a diagnosis object.

The operation range identification means 2 identifies and stores an operation range of the diagnosis object, based on the video captured by the imaging means 1.

The sound collection means 3 collects sounds arriving from the diagnosis object and a vicinity thereof.

The abnormal-sound sensing means 4 senses an abnormality of a sound included in the collected sounds.

When an abnormality of a sound is sensed by the abnormal-sound sensing means 4, the abnormal-sound generation position identification means 5 identifies a position at which the abnormality of the sound occurs.

The abnormal-sound derivation determination means 6 compares the operation range and the abnormal-sound generation position of the diagnosis object, and determines whether an abnormal sound is derived from an abnormality of the diagnosis object.

As described above, the abnormal-sound detection device according to the present example embodiment can select and detect an abnormality of a sound derived from an abnormality of a diagnosis object. Thus, an abnormal-sound detection device in which incorrect detection is rare can be provided.

Second Example Embodiment

Figure 2:
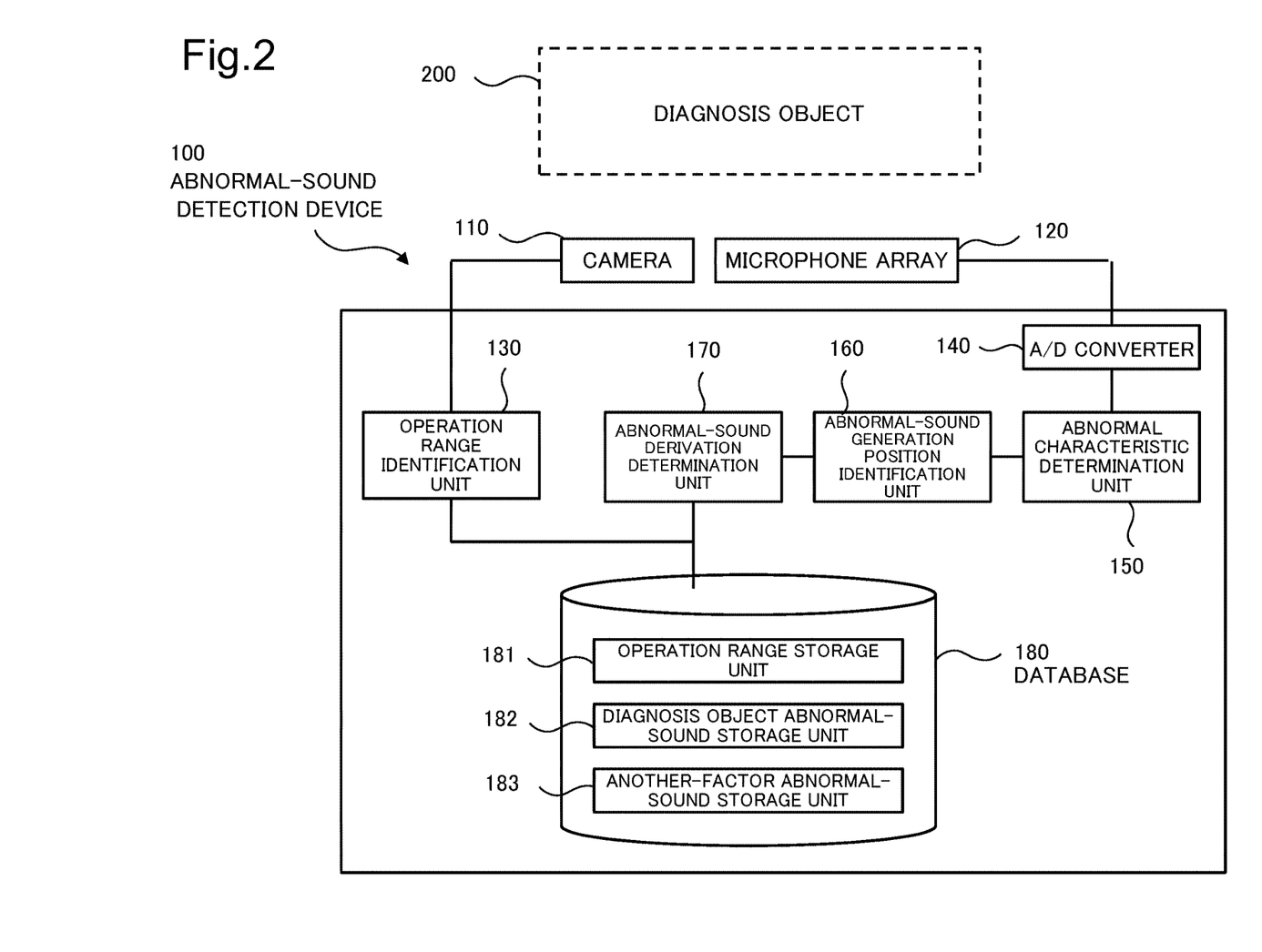
FIG. 2 is a block diagram illustrating an abnormal-sound detection device according to a second example embodiment.

FIG. 2 is a block diagram illustrating an abnormal-sound detection device 100 according to the present example embodiment. The abnormal-sound detection device 100 includes a camera 110 that optically captures a diagnosis object 200, and a microphone array 120 that collects a sound arriving from the diagnosis object. The abnormal-sound detection device 100 also includes an operation range identification unit 130, an A/D converter 140, an abnormal characteristic determination unit 150, an abnormal-sound generation position identification unit 160, an abnormal-sound derivation determination unit 170, and a database 180. Herein, A/D is an abbreviation of analog/digital. The database 180 includes an operation range storage unit 181 that stores an identified operation range, a diagnosis object abnormal-sound storage unit 182 that stores an abnormal sound derived from a diagnosis object, and an another-factor abnormal-sound storage unit 183 that stores an abnormal sound derived from a factor other than the diagnosis object.

The operation range identification unit 130 identifies an operation range of the diagnosis object 200 from a video captured by the camera 110. Although an identification method of an operation range may be any method, a feature point is extracted from the video, and a shape of a diagnosis object is recognized based on the feature point, for example. An operation range of the diagnosis object can be identified based on a movement range of the feature point in a predetermined period. The operation range is stored in the operation range storage unit 181. Although description is given herein by use of an example in which an imaging means is the camera 110, an imaging means may be a three-dimensional sensor (3D sensor). The three-dimensional sensor is, for example, a sensor which measures a distance to each point of an object by scanning with pulse laser. It is possible to form an image of the diagnosis object from data acquired by the three-dimensional sensor. Although description is given assuming that the number of cameras is one, the number of cameras may be a plural number. The database may be abbreviated as DB in the following description.

The A/D converter 140 converts a sound collected by the microphone array 120 into a digital signal. The microphone array 120 is a plurality of microphones arrayed by a predetermined rule. When this microphone array 120 is used, a direction of a sound source can be estimated from a difference in arrival time or a phase difference of sounds each arriving at each microphone from the same sound source.

The abnormal characteristic determination unit 150 determines an abnormal characteristic of a sound signal input from the A/D converter 140. Although a way of determination may be any way, determination can be performed by magnitude of a sound pressure level of a sound signal, or can be performed by sound quality, for example. A sound signal is frequency-analyzed, and sound quality can be represented by a ratio of each frequency component, for example. A change rate of a sound with time, such as a sound pressure level or a speed of variation in sound quality may be used.

With regard to a sound determined by the abnormal characteristic determination unit 150 to have an abnormal characteristic, the abnormal-sound generation position identification unit 160 identifies a position at which the abnormal sound is generated. Identification of a position can be performed based on a difference in arrival time at each microphone or a phase difference of sounds determined to be the same sound from a correlativity, for example.

The abnormal-sound derivation determination unit 170 compares an operation range stored in the operation range storage unit 181 with an abnormal-sound generation position, and identifies whether the generation position of the abnormal sound is within the operation range or out of the operation range. When the abnormal-sound generation position is within the operation range, the abnormal-sound derivation determination unit 170 determines that the abnormality of the sound is derived from the diagnosis object, and stores the abnormal sound in the diagnosis object abnormal-sound storage unit 182.

On the other hand, when the abnormal-sound generation position is out of the operation range, the abnormal-sound derivation determination unit 170 determines that the abnormality of the sound is derived from a factor other than the diagnosis object. The abnormal-sound derivation determination unit 170 stores such an abnormal sound unrelated to the diagnosis object in the another-factor abnormal-sound storage unit 183 as an another-factor abnormal sound.

Figure 3:
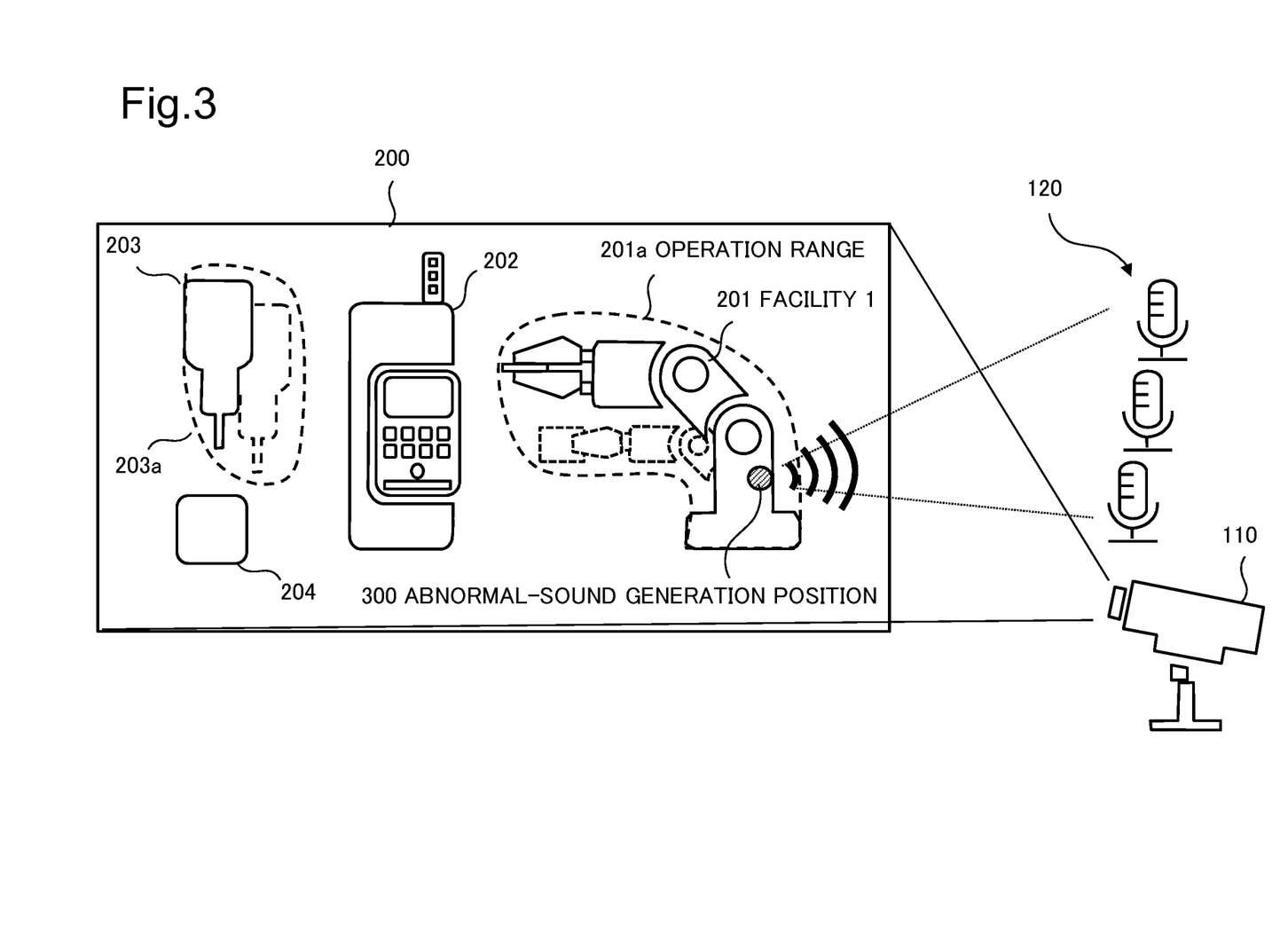
FIG. 3 is a schematic diagram illustrating measurement of an abnormal sound of a diagnosis object according to the second example embodiment.

FIG. 3 is a schematic diagram illustrating measurement status when an abnormal sound is generated in an operation range of a diagnosis object. The camera 110 captures a video of the diagnosis object 200, and the microphone array 120 collects sounds arriving from the diagnosis object 200 and a vicinity thereof. In this example, facilities 201, 202, 203, and 204 are included as elements of the diagnosis object 200. An operation range 201a of the facility 201, and an operation range 203a of the facility 203 are indicated by dotted lines. Since the facilities 202 and 204 are immobile, it is assumed that operation ranges thereof correspond to outer shapes of the facilities.

In the example of FIG. 3, presence of an abnormal-sound generation position 300 within the operation range 201a of the facility 201 is identified based on an output of the microphone array 120. In such a case, it is determined that the facility 201, i.e., a diagnosis object has an abnormality, and an abnormal sound is derived from the diagnosis object.

Figure 4:
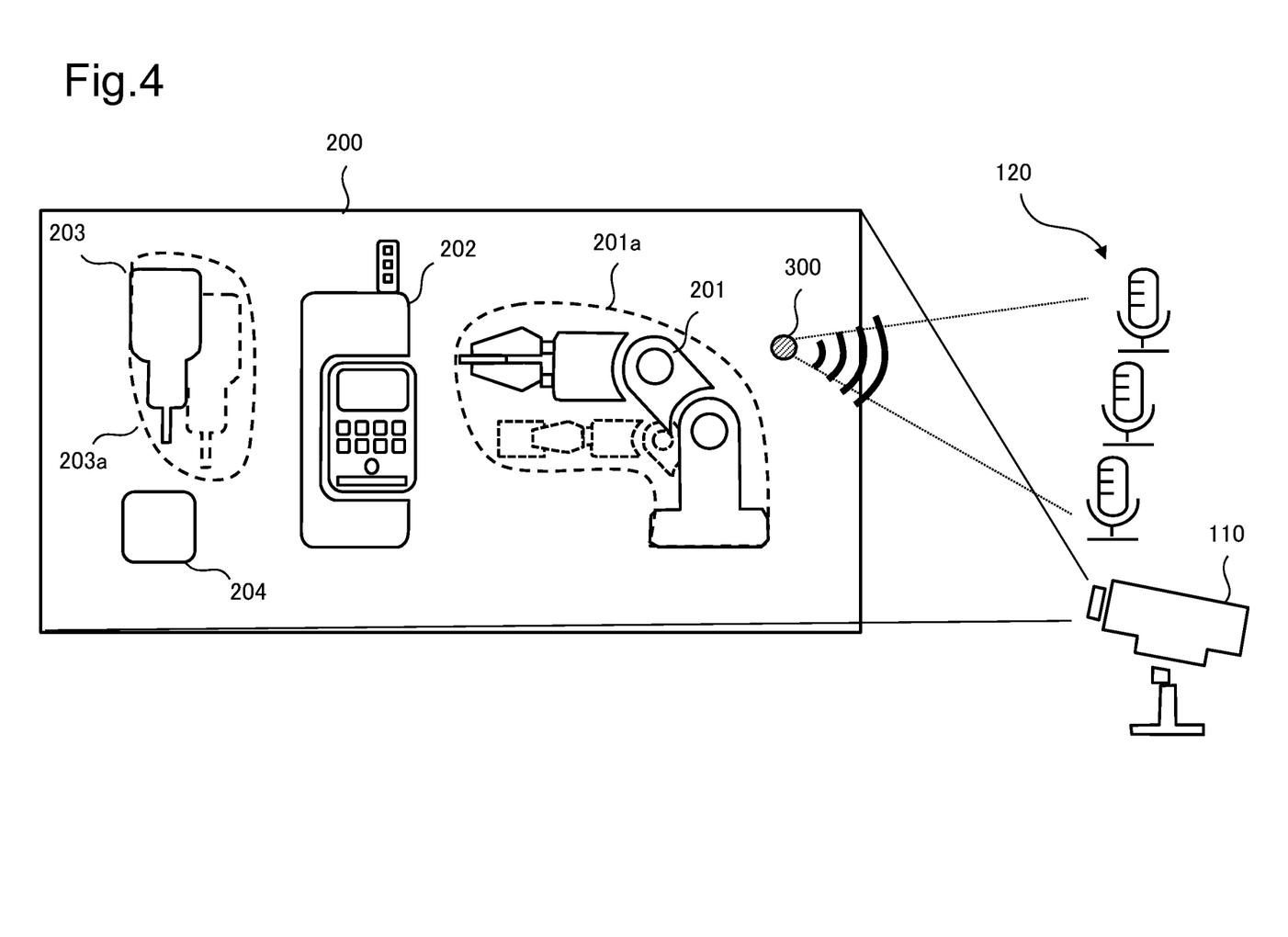
FIG. 4 is a schematic diagram illustrating measurement of an abnormal sound derived from an object other than a diagnosis object according to the second example embodiment.

FIG. 4 is a schematic diagram illustrating a measurement example when an abnormality of a sound occurs out of an operation range of a diagnosis object. In this case, presence of the abnormal-sound generation position 300 out of an operation range of a facility being a diagnosis object is identified based on an output of the microphone array 120, and it is determined that the abnormality of the sound is derived from a factor other than the diagnosis object. As in this example, when a running state of a facility of a factory or the like is continuously monitored, entry of a person into a monitoring area, carrying of goods, or the like can be cited as an example of a cause for generation of an abnormal sound of another factor, for example.

Figure 5:
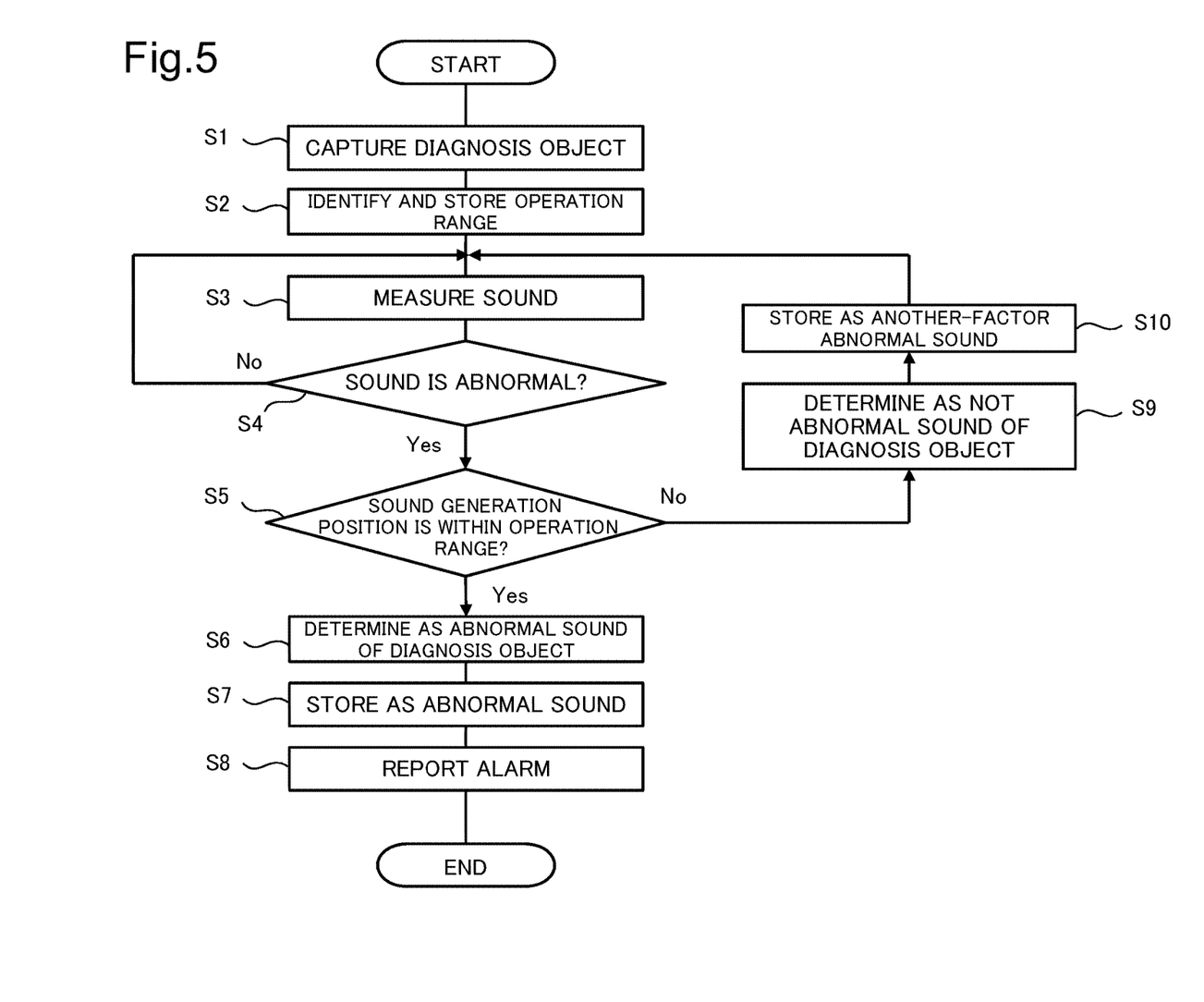
FIG. 5 is a flowchart illustrating an operation of the abnormal-sound detection device according to the second example embodiment.

FIG. 5 is a flowchart illustrating an operation of the abnormal-sound detection device 100 described above. First, a diagnosis object is captured (S1). Next, an operation range of the diagnosis object is identified based on a captured video (S2). Next, a sound of the diagnosis object is measured (S3). Whether the measured sound has an abnormal characteristic is determined (S4). Herein, when the sound has no abnormal characteristic (S4_No), a return is made to S3, and measurement of a sound, i.e., monitoring of a sound is repeated. On the other hand, when the sound has an abnormal characteristic, whether a generation position of the sound is within the operation range of the diagnosis object is determined (S5). When the generation position of the sound is within the operation range (S5_Yes), it is determined that the sound is an abnormal sound of the diagnosis object (S6), and is stored in the database as the abnormal sound together with information on the sound generation position (S7). Further, an alarm indicating that the abnormal sound is detected may be reported (S8).

On the other hand, when the generation position of the sound having an abnormal characteristic is out of the operation range of the diagnosis object, it is determined that the sound is not an abnormal sound of the diagnosis object (S9), and is stored in the database as an another-factor abnormal sound (S10). A return is made to S3, and monitoring of a sound is continued.

As described above, according to the present example embodiment, incorrect detection that detects, as an abnormal sound of a diagnosis object, an abnormal sound derived from a factor other than the diagnosis object is eliminated, and abnormal-sound detection accuracy can be improved.

Third Example Embodiment

Figure 6:
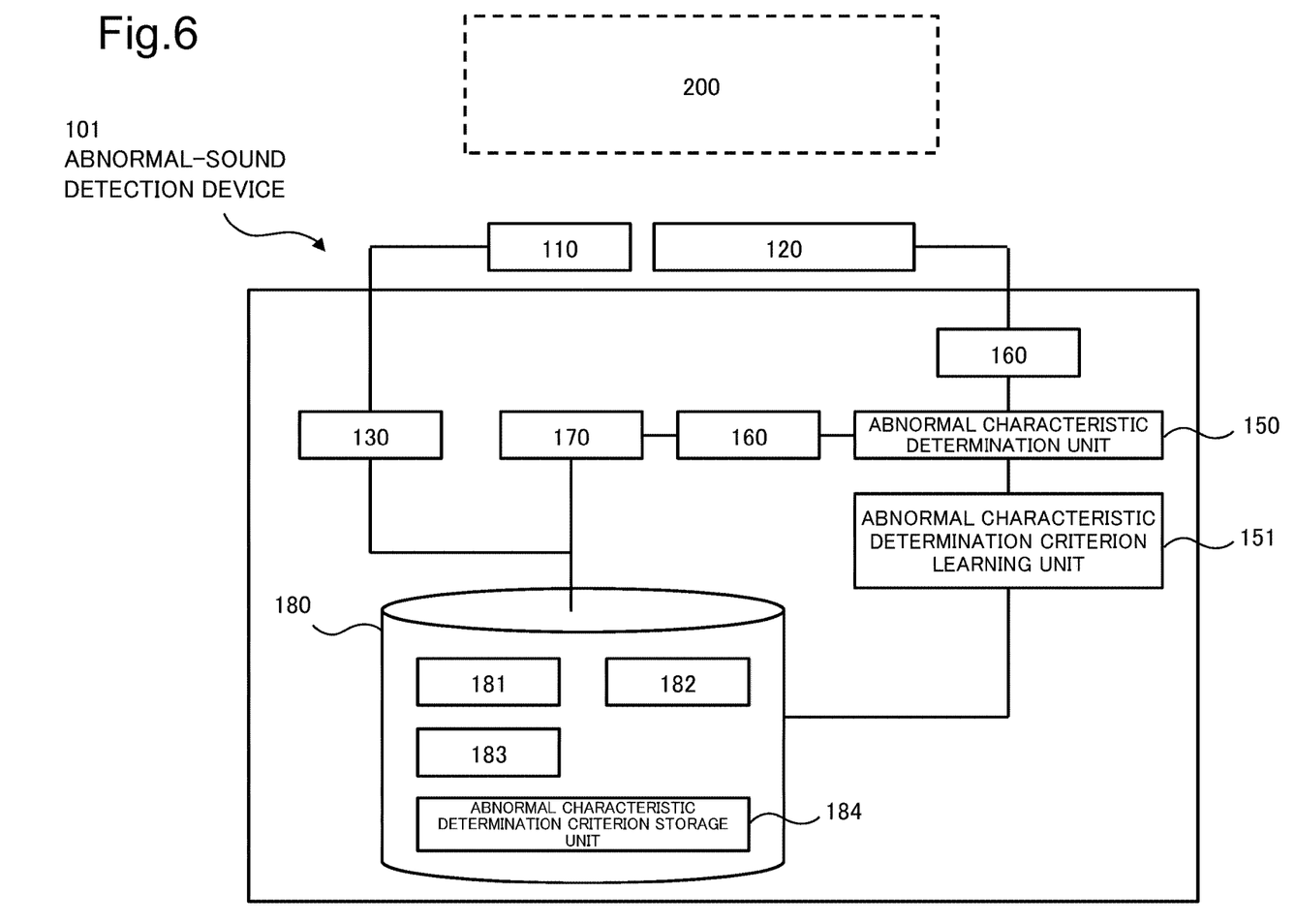
FIG. 6 is a block diagram illustrating a configuration example of an abnormal-sound detection device according to a third example embodiment.

FIG. 6 is a block diagram illustrating an abnormal-sound detection device according to the present example embodiment. An abnormal-sound detection device 101 has nearly the same configuration as the abnormal-sound detection device 100 according to the second example embodiment, but an abnormal characteristic determination unit 150 is equipped with an abnormal characteristic determination criterion learning unit 151.

The abnormal characteristic determination criterion learning unit 151 machine-learns an abnormal characteristic determination criterion. Specifically, for example, the abnormal characteristic determination criterion learning unit 151 machine-learns, for a predetermined period or a predetermined number of times, a sound measured in a period in which a diagnosis object does not generate an abnormal sound, and forms an abnormal characteristic determination criterion such as a criterion value of a normal sound or an allowable limit value. Although a method of machine learning may be any method, a self-organizing map method, a k-nearest neighbor method, or the like can be used, for example. The abnormal characteristic determination criterion learning unit 151 stores the learned abnormal characteristic determination criterion in an abnormal characteristic determination criterion storage unit 184.

Figure 7:
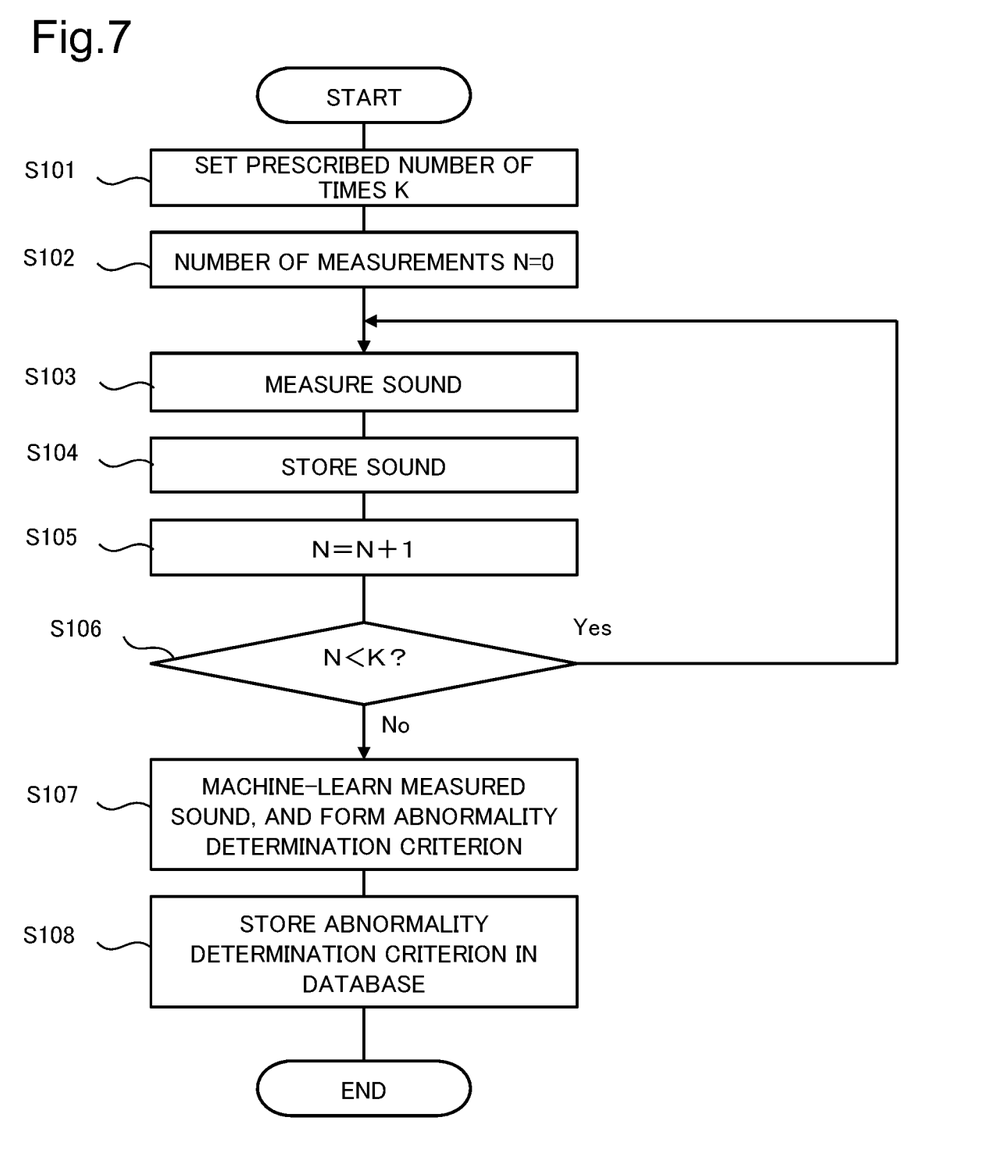
FIG. 7 is a flowchart illustrating a learning operation of an abnormality determination criterion according to the third example embodiment.

Next, an operation of the abnormal characteristic determination criterion learning unit 151 is described. FIG. 7 is a flowchart illustrating the operation of the abnormal characteristic determination criterion learning unit 151. First, a measurement period or the number of measurements for performing learning is set (S101). For example, when a running state of a facility of a factory or the like is continuously monitored, setting may be performed with the number of times of predetermined operations because a facility or the like repeatedly performs the same operation. Thus, herein, description is given assuming that setting is performed with the number of times. Setting may be performed with a predetermined period. At start of machine learning, a number of measurements N is first reset. In other words, N=0 is set (S102).

Next, a sound of a diagnosis object is measured in order to collect data for learning (S103). Then, the measured sound is recorded (S104). After recording, N=N+1 is set by adding 1 to the number of measurements N (S105). Herein, when the updated N is less than a predetermined number of times K (S106_Yes), a return is made to S103, and measurement of a sound is repeated. On the other hand, when N=K (S106_No), machine learning for statistically processing data on a recorded sound is performed, and an abnormal characteristic determination criterion is formed (S107). The formed abnormal characteristic determination criterion is stored in the abnormal characteristic determination criterion storage unit 184 (S108).

When an abnormal characteristic determination criterion formed by machine learning as above is used, an abnormal sound generated from a diagnosis object can be detected as a sound being far from a normal value even when the abnormal sound is an unknown sound.

As described above, according to the present example embodiment, an abnormal-sound detection device being capable of detecting an unknown abnormal sound can be configured.

A program causing a computer to execute the processing according to the first to third example embodiments described above, and a recording medium storing the program also fall within the scope of the present invention. For example, a magnetic disk, a magnetic tape, an optical disk, a magnet-optical disk, a semiconductor memory, or the like can be used as the recording medium.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2018-026170, filed on Feb. 16, 2018, the disclosure of which is incorporated herein in its entirety by reference.

REFERENCE SIGNS LIST

1 Imaging means
2 Operation range identification means
3 Sound collection means
4 Abnormal-sound sensing means
5 Abnormal-sound generation position identification means
6 Abnormal-sound derivation determination means
100, 101 Abnormal-sound detection device
110 Camera
120 Microphone array
130 Operation range identification unit
140 A/D converter
150 Abnormal characteristic determination unit
151 Abnormal characteristic determination criterion learning unit
160 Abnormal-sound generation position identification unit
170 Abnormal-sound derivation determination unit
180 Database
181 Operation range storage unit
182 Diagnosis object abnormal-sound storage unit
183 Another-factor abnormal-sound storage unit
184 Abnormal characteristic determination criterion storage unit
200 Diagnosis object
300 Abnormal-sound generation position

The invention claimed is:

1. An abnormal-sound detection device comprising:
at least one memory storing instructions; and
at least one processor configured to access the at least one memory and execute the instructions to:
  extract a feature point of a diagnosis object from a video of the diagnosis object captured by a camera;
  identify an operation range of the diagnosis object, based on a movement range of the extracted feature point;
  sense a sound in which an abnormality has occurred from among sound collected by a microphone;
  identify, based on the collected sound, a generation position of the sound in which the abnormality is sensed; and
  determine, based on the operation range and the identified generation position, whether the sound in which the abnormality is sensed is derived from the diagnosis object or derived from another element.

2. The abnormal-sound detection device according to claim 1, wherein
the at least one processor is further configured to execute the instructions to:
determine that the sound in which the abnormality is sensed is an abnormal sound of the diagnosis object, when the generation position of the sound in which an abnormality is sensed is in the operation range.

3. The abnormal-sound detection device according to claim 1, wherein
the at least one processor is further configured to execute the instructions to:
determine that the sound in which the abnormality is sensed is an abnormal sound derived from a factor other than the diagnosis object, when the generation position of the sound in which an abnormality is sensed is out of the operation range.

4. The abnormal-sound detection device according to claim 1, wherein
the at least one processor is further configured to execute the instructions to:
identify the generation position of the sound in which the abnormality is sensed, based on a difference of sounds each collected by each of microphones in a microphone array in which a plurality of microphones are arrayed.

5. The abnormal-sound detection device according to claim 1, wherein
the at least one processor is further configured to execute the instructions to:
perform a machine learning to generate an abnormal characteristic determination criterion for determining an abnormal characteristic of the sound, based on sounds collected from the diagnosis object and a vicinity thereof.

6. An abnormal-sound detection method comprising:
capturing a video of a diagnosis object by a camera;
extracting a feature point of the diagnosis object from the video of the diagnosis object captured by the camera;
identifying an operation range of the diagnosis object, based on a movement range of the extracted feature point;
collecting sounds arriving from the diagnosis object by a microphone;
sensing a sound in which an abnormality has occurred from among the sounds collected by the microphone;
identifying, based on the collected sound, a generation position of the sound in which the abnormality is sensed; and
determining, based on the operation range and the identified generation position, whether the sound in which the abnormality is sensed is derived from the diagnosis object or derived from another element.

7. The abnormal-sound detection method according to claim 6, further comprising
determining that the sound in which the abnormality is sensed is an abnormal sound of the diagnosis object, when the generation position of the sound in which an abnormality is sensed is within the operation range.

8. The abnormal-sound detection method according to claim 6, further comprising
determining that the sound in which the abnormality is sensed is an abnormal sound derived from a factor other than the diagnosis object, when the generation position of the sound in which an abnormality is sensed is out of the operation range.

9. The abnormal-sound detection method according to claim 6, further comprising:
collecting the sounds by use of a microphone array in which a plurality of microphones are arrayed; and
identifying the generation position of the sound in which the abnormality is sensed, based on a difference of the sounds each collected by each of the microphones.

10. A non-transitory computer-readable recording medium recording an abnormal-sound detection program that causes a computer to execute:

extracting a feature point of a diagnosis object from a video of the diagnosis object captured by a camera;
identifying an operation range of a diagnosis object, based on a movement range of the extracted feature point;
sensing a sound in which an abnormality has occurred from among sound collected by a microphone;
identifying, based on the collected sound, a generation position of the sound in which the abnormality is sensed; and
determining, based on the operation range and the identified generation position, whether the sound in which the abnormality is sensed is derived from the diagnosis object or derived from another element.

\* \* \* \* \*